Dec. 1, 1964    J. C. CAMPBELL, JR., ETAL    3,159,387
RAPID CYCLING HEAT TREATING FURNACE AND METHOD OF OPERATION
Filed Aug. 9, 1962    2 Sheets-Sheet 1

INVENTORs:
HARRY N. MORGAN
JOSIAH C. CAMPBELL JR.
BY
R. F. Bryant
ATTORNEY

Dec. 1, 1964 J. C. CAMPBELL, JR., ETAL 3,159,387
RAPID CYCLING HEAT TREATING FURNACE AND METHOD OF OPERATION
Filed Aug. 9, 1962 2 Sheets-Sheet 2

INVENTORs:
HARRY N. MORGAN
JOSIAH C. CAMPBELL JR.
BY
R. H. Bryant
ATTORNEY 3,159,387
RAPID CYCLING HEAT TREATING FURNACE
AND METHOD OF OPERATION
Josiah C. Campbell, Jr., Signal Mountain, and Harry N. Morgan, Chattanooga, Tenn., assignors to Combustion Engineering, Inc., Windsor, Conn., a corporation of Delaware
Filed Aug. 9, 1962, Ser. No. 215,823
3 Claims. (Cl. 263—40)

This invention relates to a heat treating furnace and its method of operation, and in particular to such a furnace which can be rapidly heated and thereafter rapidly cooled.

One presently used arrangement for heat treating of materials is to provide a battery of furnaces, each holding a given temperature, or a long conveyor line furnace with various zones of temperature control and cooling zones. This type of arrangement is very costly to construct and operate, and also requires the use of a large amount of plant floor space. Another type of furnace operation conventionally used for heat treating wherein rapid cooling of the furnace interior is desired, is to blow air into the furnace through the burner openings after the flame has been extinguished. This cooling air, however, can cause considerable cracking and spalling both to the burner block and the furnace walls due to thermal shock, thus requiring continuous repair, and shutdown periods in which to make such repair. Such technique also does not result in uniform cooling of the furnace interior, and the members contained therein which are being heat treated.

It is an object of this invention to provide a compact, economical, efficient heat treating furnace, and the method of operation thereof, which is capable of being rapidly heated and thereafter rapidly cooled without causing damage to the furnace walls.

It is a further object of this invention to provide a heat treating furnace having porous wall means through which air is continuously forced to thereby provide for uniform heating and cooling of such furnace wall means and also the material contained in such furnace.

Figure 1:
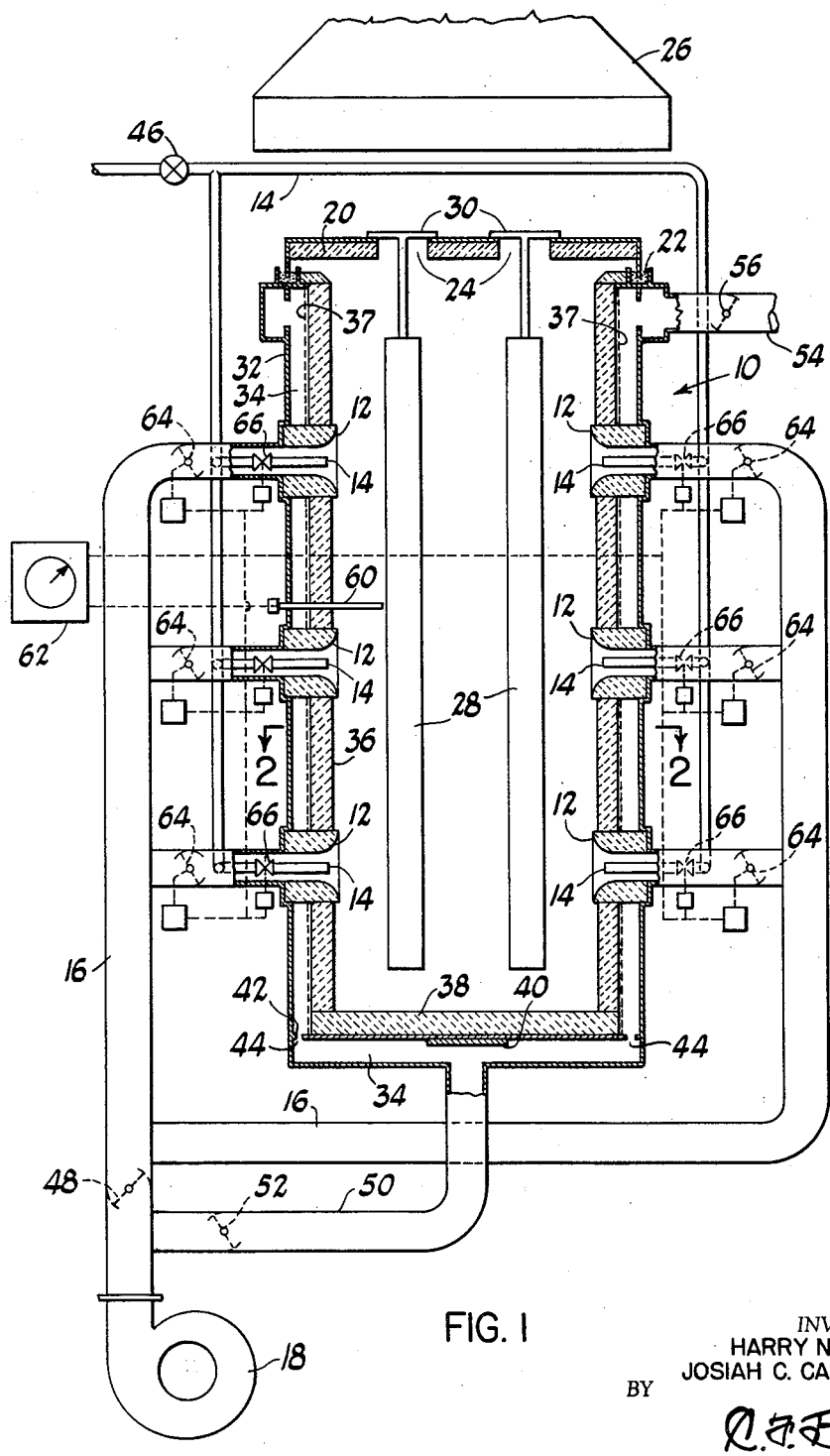
Figure 2:
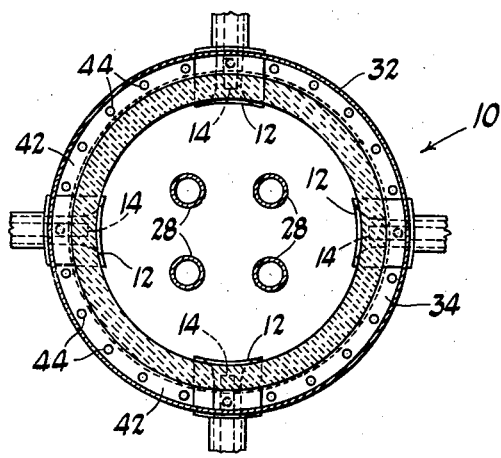

Other and further objects will be more fully understood from the specification hereinafter following by reference to the accompanying drawings in which:

FIG. 1 is a cross sectional side view of the rapid cycling heat treating furnace constructed in accordance with our invention; and FIG. 2 is a cross sectional plan view taken along line 2—2 of FIG. 1.

Looking now to the figures, numeral 10 designates the heat treating or cycling furnace in its entirety. Burners 12 are mounted in the furnace walls. As illustrated, there are twelve burners located at three different levels, the four burners on each level being spaced 90° apart. Pipe 14 supplies fuel, in this instance gas, to be burned in the burners 12. Air ducts 16 convey the air to support combustion of the fuel which is supplied by means of forced draft fan 18.

The furnace contains an inner cylindrical brick wall 36, such wall being made up of porous insulating firebrick. This brick can be made of fire clay, a carrier (such as cork), and a suitable binding material. The formed bricks are heated, causing the cork to burn up, resulting in a highly porous brick, commonly known as insulating firebrick. The refractory brick wall is contained and reinforced around its outer surface by wire screen or mesh 37.

The furnace bottom 38 is made of a suitable insulating refractory material. Outer cylindrical metal casing or housing 32 is spaced from and surrounds the porous brick wall 36. The outer surface of the refractory wall 36 along with the metal housing 32 thus forms a chamber 34 therebetween. The furnace roof 20 can be made of a non-porous refractory material and a metal plate, and such roof is removable from the furnace in order to permit ready access to the furnace interior. A metal cylindrical flange on the roof 20 rests in an annular sand seal 22. Four circular openings 24 may be formed in roof 20, through which openings the members to be heat treated may be inserted into the furnace. These openings 24 also allow the escape of exhaust gases from the furnace 10 up into the exhaust hood 26, which can be swung aside for loading and unloading the furnace. In the event the workpiece size does not permit loading through vent opening 24, the furnace roof 20 may be lifted and swung aside in conjunction with exhaust hood 26 to allow full access to the furnace interior.

As illustrated, typical elements to be heat treated are metal tubes 28 and these tubes are supported in the furnace by means of rods 30 lying across openings 24 in the roof 20. It is to be understood that these rods 30 should not be of such a size that they would restrict to any great degree flow of combustion gases through the openings 24.

Air is also supplied to the chamber 34 by means of duct 50, such air being evenly distributed and discharged into the chamber 34 through small circular orifices 44 contained in the circular metal member 42. Metal plate 40 is secured to the furnace bottom 38 in order to prevent a "cold" spot from developing on the refractory bottom during operation.

Value 46 is positioned in the gas pipe 14 for the purpose of shutting off the flow of fuel to all of the burners. Similarly, damper 48 located in the air duct can be used to shut off the flow of air to all of the burners when desired. Damper 52 located in air duct 50 can be used to vary the flow of air to the chamber 34. Outlet duct 54, through which air can be discharged from chamber 34, contains a damper 56.

Any suitbale control system can be used in conjunction with the illustrated furnace. For example, thermocouple 60 shown located at the central burner level, can be used to sense the temperature within the furnace adjacent the metallic members 28 to thereby control the flow of fuel and air to the furnace by modulating dampers 64 and valves 66, through the use of a suitable control unit 62. Multiple zones of temperature control can be established by the use of additional thermocouples 60 and control instruments 62, if desired.

The operation of the heat treating furnace 10 will now be described. Hood 26 is initially swung aside from the furnace roof 20, in order to permit the metal tubes 28 to be positioned within the furnace. Fuel and air are then supplied to the burners 12, and at the same time air is also supplied to the chamber 34, damper 56 being closed, or partially closed, to thus maintain a positive pressure with respect to the heating chamber within the chamber 34. The burners 12 are fired fuel rich, or in other words more fuel is supplied to each burner than the air being supplied thereto is capable of supporting combustion of. The flame issuing from burners 12 is preferably a short, flat flame, that spreads out along the surface of the furnace walls. In this manner, the air flowing from chamber 34 through the porous brick wall means 36 thus supplies air necessary to support the combustion of the excess fuel. The excess fuel burns adjacent the furnace wall throughout its entire surface, thus providing uniform heat throughout the furnace. The air flowing through the porous wall means also prevents the loss of heat from the furnace through such wall means, since the heat is carried back into the furnace by the flowing air. This air flowing through and by the wall means 36 also cools the wall, and thus such wall will not reach the high temperatures which the wall of a conventional furnace would.

After thermocouple 60 senses the temperature at which the furnace is to be controlled, through controller 62 this temperature can be held for a given or predetermined length of time, and then automatically shuts off the burners. The flow of fuel and air to the burners is at this time stopped, with the flow of air to the chamber 34 still maintained. The rate of air flow to the chamber 34 may be varied by the damper 52 to obtain the desired rate of cooling. This air will continue to flow through the porous wall 36, and will rapidly cool the furnace interior and the metal members 28. Since the air within chamber 34 flows through and by the wall means 36 over its entire surface area, very uniform cooling of the furnace wall and the elements 28 is accomplished. This uniform cooling, in conjunction with the fact that the furnace walls were maintained relatively cool during the heating cycle by the air passing through and by wall 36, prevents the brick from cracking or spalling due to thermal shock. Spalling is the flaking off of the brick due to thermal shock, or rapid and uneven temperature changes.

The rapid cycling furnace constructed in accordance with our invention results in a number of advantages over the use of a standard heat treating furnace. By means of the air being forced through the porous walls, the furnace can be fired at a rate higher than the combined maximum rated B.t.u. input of the burners, since the air flowing through the walls can be used to supply the combustion air necessary for the excess fuel, thus resulting in a secondary combustion effect within the furnace. This burning of the excess fuel takes place along the entire surface of wall 36, thus resulting in a uniform heating of the entire furnace interior and also the metal elements 28. The air entering through the porous wall 36 also maintains the furnace wall relatively cool during the heating cycle, and thus very little heat is stored in these walls. This enables a rapid cooling cycle to be effected, and also prevents cracking or spalling of the furnace wall to any great extent. The furnace wall 36 of the furnace can be relatively thin, since the air passing therethrough prevents heat discharge through such wall. In one instance, where a 2400° F. furnace was twelve feet in height and approximately three feet inside diameter, the wall 36 was four and a half inches thick. In a conventional heat treating furnace, which must necessarily utilize more insulating refractory material, the wall thickness for a similar sized furnace would be two or more times as thick depending on how much heat storage, heat loss and furnace casing temperature could be tolerated.

The maximum useful temperature for annealing metals is approximately 2400° F. However, if it were desired to heat treat ceramics or other materials which require temperatures above 2400° F. it is possible to do so with the furnace of our invention without much concern of causing damage to the furnace walls, because of the cooling effect of the air passing through the porous furnace wall. This would not be possible in a conventional furnace.

Although the furnace has been disclosed as utilizing gas as the fuel, all or many of the advantages of our furnace could also be realized by using oil, electric, or other types of heating. While we have described the preferred embodiment of our invention, it is to be understood that modifications may be readily made and that the invention should not be limited other than by the scope of the appended claims.

What we claim is:

1. The method of operating a furnace having porous, enclosing wall means with a burner mounted therein, in which elements are to be heat treated, comprising the steps of introducing all of the fuel to be burned in the furnace through the burner, introducing a portion of the air for supporting combustion of the fuel through the burner, the fuel introduced thus being in excess of the amount which the burner air will support initial combustion of, forcing air to support secondary combustion of the excess fuel through the porous wall means of the furnace, and when a predetermined temperature of the elements has been reached and maintained for a predetermined length of time, stopping the introduction of fuel and air to the burner, and continuing to force air through the porous wall means of the furnace to thereby rapidly and uniformly cool the elements.

2. A furnace in which elements can be heat treated, said furnace comprising an inner, porous, upright enclosing wall means with a plurality of evenly spaced levels of burners mounted therein, each level of burners containing a plurality of burners evenly spaced around the periphery of the furnace, means for supplying fuel and air to the burner, an outer non-porous wall means spaced from and surrounding the inner wall means, duct means forming an air inlet and outlet for the space between the inner and outer wall means, air supply means connected to said inlet, and a damper positioned in the linlet and outlet, to thereby allow control of the amount of air which flows through and by the porous inner wall means.

3. The furnace set forth in claim 2, including control means for stopping the supply of fuel and air to all of the burners after a predetermined period of time, while still allowing flow of air to the space between the inner and outer wall means so as to rapidly and uniformly cool the elements.

References Cited in the file of this patent

UNITED STATES PATENTS

| | | |
|---|---|---|
| 1,304,755 | Ellis | May 27, 1919 |
| 1,545,154 | Mehner | July 7, 1925 |
| 2,311,350 | Richardson | Feb. 16, 1943 |
| 3,076,605 | Holden | Feb. 5, 1963 |